(12) United States Patent
Lin et al.

(10) Patent No.: US 10,484,640 B2
(45) Date of Patent: Nov. 19, 2019

(54) LOW POWER VIDEO COMPOSITION USING A STREAM OUT BUFFER

(71) Applicant: INTEL CORPORATION, Santa Clara, CA (US)

(72) Inventors: Yunbiao Lin, Shanghai (CN); Changliang Wang, Bellevue, WA (US); Tiehan Lu, Shanghai (CN); Qingyuan Zhang, Shanghai (CN); Li Xu, Shanghai (CN); Bo Zhao, Shanghai (CN); Changwon Rhee, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/570,640

(22) PCT Filed: Jun. 3, 2015

(86) PCT No.: PCT/CN2015/080699
§ 371 (c)(1),
(2) Date: Oct. 30, 2017

(87) PCT Pub. No.: WO2016/192060
PCT Pub. Date: Dec. 8, 2016

(65) Prior Publication Data
US 2018/0288353 A1 Oct. 4, 2018

(51) Int. Cl.
*H04N 5/445* (2011.01)
*G06T 1/60* (2006.01)

(52) U.S. Cl.
CPC ........... *H04N 5/44504* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 8,125,495 B2* | 2/2012 | Darsa | ...................... | G09G 5/14 345/592 |
| 8,207,983 B2* | 6/2012 | Taneja | ................... | G09G 5/397 345/501 |

(Continued)

FOREIGN PATENT DOCUMENTS

| | | |
|---|---|---|
| CN | 101499172 | 8/2009 |
| CN | 101989414 | 3/2011 |

(Continued)

OTHER PUBLICATIONS

International Preliminary Report on Patentability dated Dec. 14, 2017 for International Patent Application No. PCT/CN2015/080699.

(Continued)

*Primary Examiner* — James A Thompson
(74) *Attorney, Agent, or Firm* — Green, Howard & Mughal LLP.

(57) ABSTRACT

Techniques related to compositing video content are discussed. Such techniques may include generating transparency data for a surface of first video content and storing it in a stream out buffer, accessing the transparency data via the stream out buffer when there is no change to the surface of the first video content, and compositing the first video content with second video content based on the accessed transparency data.

25 Claims, 7 Drawing Sheets

(56) References Cited

U.S. PATENT DOCUMENTS

| | | | | |
|---|---|---|---|---|
| 8,570,441 | B2* | 10/2013 | Nakayama | H04N 9/76 345/592 |
| 10,158,841 | B2* | 12/2018 | Newton | H04N 19/597 |
| 2009/0262122 | A1* | 10/2009 | Darsa | G09G 5/14 345/545 |
| 2009/0310023 | A1* | 12/2009 | Nakayama | H04N 7/013 348/584 |
| 2010/0207957 | A1* | 8/2010 | Taneja | G09G 5/397 345/592 |
| 2011/0025917 | A1 | 2/2011 | Honme | |
| 2011/0169847 | A1 | 7/2011 | Bratt et al. | |
| 2011/0249757 | A1* | 10/2011 | Newton | H04N 19/597 375/240.25 |
| 2013/0162911 | A1* | 6/2013 | Glen | H04N 21/234327 348/586 |
| 2013/0271448 | A1* | 10/2013 | Lazarski | H04N 13/156 345/419 |
| 2014/0306865 | A1* | 10/2014 | Pan | G06F 3/1423 345/2.1 |

FOREIGN PATENT DOCUMENTS

| | | |
|---|---|---|
| CN | 104010136 | 8/2014 |
| WO | 2012068010 | 5/2012 |

OTHER PUBLICATIONS

International Search Report & Written Opinion, dated Feb. 24, 2016, for PCT Patent Application No. PCT/CN15/80699.

\* cited by examiner

US 10,484,640 B2

LOW POWER VIDEO COMPOSITION USING A STREAM OUT BUFFER

CLAIM OF PRIORITY

This Application is a National Stage Entry of, and claims priority to, PCT Application No. PCT/CN2015/080699, filed on 3 Jun. 2015 and titled "LOW POWER VIDEO COMPOSITION USING A STREAM OUT BUFFER", which is incorporated by reference in its entirety for all purposes.

BACKGROUND

In some video presentation contexts, video composition may be performed to composite multiple sources of content for presentation to a user. For example, one source of content may include video frames of a video sequence and another source of content may include a user interface (e.g., playback buttons, an operating system status bar, or the like). Such video composition may be common in media usages on mobile devices, in online viewing, video playback over wireless, and so on.

For example, due to the relatively small size and low resolution of display panels on mobile devices such as smart phones, tablets, and the like, a user may cast video content to a larger remote display (e.g., a television display) via wireless transmission for presentment. In such a context, current techniques may composite the video content and a background user interface and transmit an encoded bitstream including the composited content to the remote display for decoding and presentment. For example, the composition may composite a background user interface (e.g., layer 0), a status bar (e.g., layer 1), and video content (e.g., layer 2), encode the resultant video stream, and transmit the encoded bitstream to the remote display. The background user interface and the status bar may, for example, be in a red, green, blue, alpha (RGBA or ARGB) color space with the alpha channel including opacity information and the video content may be in a YUV (luminance and two color channel) color space that does not include an opacity channel.

Another context for such video composition techniques includes presentment of video to a user in a camera preview mode on a camera, smartphone, tablet, or the like. Such video composition may leverage the 3D (3-dimensional) pipeline of the device to composite video preview data (e.g., in YUV) with a background user interface information (e.g., in RGBA) and render the composited content for local display to a user.

Typically, such video composition techniques may include performing alpha blending at each pixel to composite the frames. For example, the alpha blending may include combining the pixel color of the video and the pixel color(s) of the one or more user interface(s) to generate a blended pixel color. Such techniques may be computationally expensive and costly in terms of power usage. To address such problems, current techniques include accessing the alpha channel of RGBA user interface frames and, if all of the alpha values indicate transparency, skipping such alpha blending. However, such detection techniques are relatively slow and cannot be performed for every frame without disruption and/or high power usage.

It may be advantageous to composite multiple sources of video efficiently, with low computation and memory resource requirements, and low power usage. It is with respect to these and other considerations that the present improvements have been needed. Such improvements may become critical as the desire to composite multiple sources of video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
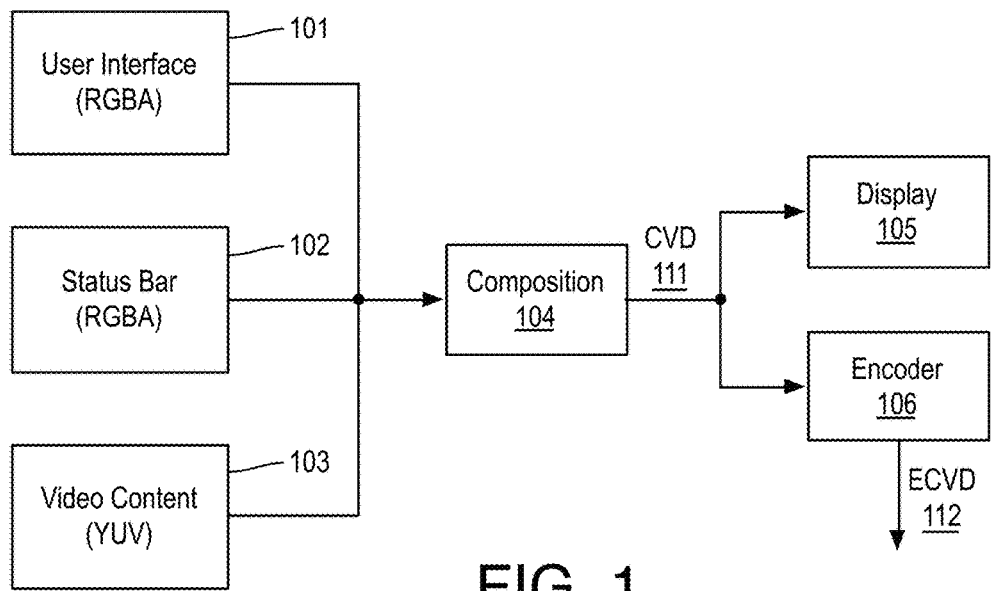
FIG. 1 illustrates an example data flow for compositing video content.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to compositing video content and, in particular, to compositing video content using transparency data associated with a surface of the video content.

As described above, video composition may be performed to composite multiple sources of content for presentation to a user. It may be advantageous for such techniques to be computationally efficient and use low power. In some embodiments discussed herein, compositing video content may include generating transparency data (e.g., a transparency bit map or the like) associated with a surface of a first video content source. For example, the surface may be divided into regions, blocks, or rows of blocks, or the like and a bit may be associated with each region, block, row of blocks, or the like such that a bit of 1 indicates non-transparency (e.g., at least one pixel in the region, block, row of blocks, or the like is non-transparent) and a bit of 0 indicates transparency (e.g., all pixels in the region, block, row of blocks, or the like are transparent), or vice versa. For example, such transparency data may be generated at a composition operation and stored in a stream out buffer associated with the surface of the first video content. Furthermore, at the composition operation, the surface of the first video content may be composited with a surface of second video content. In some examples, second transparency data associated with the surface of second video content may also be generated.

At a subsequent composition operation, a determination may be made as to whether the first video content has changed. For example, the same surface may be needed to be blended at the subsequent composition operation. If the first video content has not changed, the transparency data may be accessed and used to perform the compositing. For example, for a region, block, row of blocks, or the like having a bit of 0 indicating transparency, blending (e.g., alpha blending) may be skipped and the associated region, block, row of blocks, or the like of the second video content may be copied. Such a blending skip may save substantial computing resources. For a region, block, row of blocks, or the like having a bit of 1 indicating non-transparency, blending may be performed. Such processing may continue at any number of subsequent composition operations where there is no change to the first video content. If a change to the first video content is detected, updated transparency data may be generated and the compositing may be performed as discussed based on the updated transparency data. For example, the discussed techniques may provide a stream out buffer based low power composition method.

Such techniques may accommodate compositing two video content sources or such techniques may be extended to composite three or more video content sources as is discussed further herein. Furthermore, in some examples, the transparency data may be utilized to generate an instruction call that indicates a portion of the video content that is to be processed. For example, such an instruction call may eliminate processing on fully transparent regions and/or regions that are known or predicted to be fully transparent such as the top portion of video when subtitles are to be added or the like.

The techniques discussed herein may be implemented in a variety of contexts such as presentment of video to a user in a camera preview mode on a camera, smartphone, tablet, or the like, video playback within a web browser or other application, video playback over wireless display (e.g., encoding video data for transmission to a remote display device), or the like. For example, such contexts may include common attributes such as a main source of video content not including an opacity channel (e.g., the main source of video content may typically not include an alpha channel), the main source of video content occupying all or a majority of the display screen during presentment to a user, most or part of the user interface layer being transparent (e.g., being transparent except for a relatively small control panel, subtitles, or the like), and the main source of video content updating more frequently (e.g., at 30 frames per second or more) than the user interface layer or content (e.g., at 1 frame per second or less). Using the techniques discussed herein, such attributes may be leveraged to provide an optimized and computationally efficient low power usage video composition without the introduction of visual artifacts.

FIG. 1 illustrates an example data flow 100 for compositing video content, arranged in accordance with at least some implementations of the present disclosure. As shown in FIG. 1, video content 101, 102, and 103 may be composited via composition module 104 to generate composited video data 111. In the illustrated example, video content 103 may be the main video content of interest, video content 101 may be user interface information, and video content 102 may be status bar information or a status bar interface or the like. As used herein, the term main video content of interest may be video content selected by a user for viewing, video content of a camera preview, or the like. However, video content 101, 102, 103 may include any suitable combination of video content. Furthermore, three sources of video content 101, 102, 103 are illustrated, however data flow 100 may include any number of video content sources such as two video content sources or four or more video content sources.

As shown, video content 103 may include main video content of interest in a luminance-chrominance-chrominance (YUV) color space. For example, video content 103 may have only multiple color channels and video content 103 may not have an opacity (e.g., alpha) channel. In some examples, video content 103 may include video frames from a camera module (e.g., for presentment of video preview to a user), video frames from a video source for encoding, or the like. Video content 101 may include user interface content in a red-green-blue-alpha (RGBA) color space (e.g., also characterized as ARGB) having a red channel, a green channel, a blue channel, and an alpha (e.g., opacity) channel. For example, video content 101 may have an opacity channel and multiple color channels. In some examples, video content 101 may include playback buttons, video selection information, subtitles, or the like. Furthermore, video content 102 may include status bar content in RGBA color space. In some examples, video content 102 may include user status bar interface content such as a menu mar, status information, or the like. Although illustrated with respect to the RGBA and YUV color spaces, video content 101, 102, 103 may be in any suitable color space or color spaces.

In some examples, video content 103 may be high frame rate and high resolution video content (e.g., video frames) meant to fill all or most of a display during presentment to a user. For example, video content 103 may include high definition video frames (e.g., 1080i, 1080p, 720p, or the like) having a 1920×1080 or 1280×720 pixel format or higher resolution video content. Furthermore, video content 103 may have a high frame rate such as 30 fps (frames per second), 60 fps, 120 fps, or the like. Video content 101, 102 may be lower frame rate and/or lower resolution video content relative to video content 103. For example, video content 101, 102 may have a 1120×800 pixel format or the like. Also, video content 101, 102 may have a frame rate of 1 fps or the like. Furthermore, in some examples, video content 101, 102 may not change until there is an interaction by a user via a user input device (e.g., a touchscreen, a button, a peripheral device, or the like) such as video playback, camera preview, or the like. For example, in compositing video content 101, 102, 103, many frames of video content 103 may be blended with the same frame of video content 101 and/or video content 102.

Furthermore, video content 101, 102 may include video content (e.g., video frames) having a large portion of transparent regions. For example, video content 101, 102 may be transparent except for a predefined portion of a display such as a bottom portion for presenting video playback buttons or subtitles or the like or a top portion for presenting a status bar or the like. Such display layouts may be common to keep such elements out of the main viewing portion of the display so as not to disrupt the viewing experience of the user, however the techniques discussed herein are not limited to such layouts. For example, video content 101, 102 may include any number, amount, and arrangement of non-transparent regions.

As shown in FIG. 1, video content 101, 102, 103 may be composited via composition module 104 to generate composited video data 111. Video content 101, 102, 103 may be composited via composition module 104 using techniques discussed in more detail herein such as generating transparency data associated with one or more of surfaces associated with video content 101, 102, 103, retaining such transparency data when there is no change to the associated video content, and performing blending (e.g., alpha blending) based on the retained transparency data. Composited video data 111 may be provided to a display 105, an encoder 106, and/or other subsystems for further processing. In some examples, composited video data 111 may be rendered and presented to a user via display 105 as a camera preview, a video presentment via a web browser or other application, or the like. In some examples, video content 101, 102, 103 may be encoded via encoder 106 to generate encoded composited video data 112. Such encoded composited video data 112 may be transmitted to a remote display device (e.g., via wireless display technology) for display to a user, stored via memory, or the like.

Figure 2:
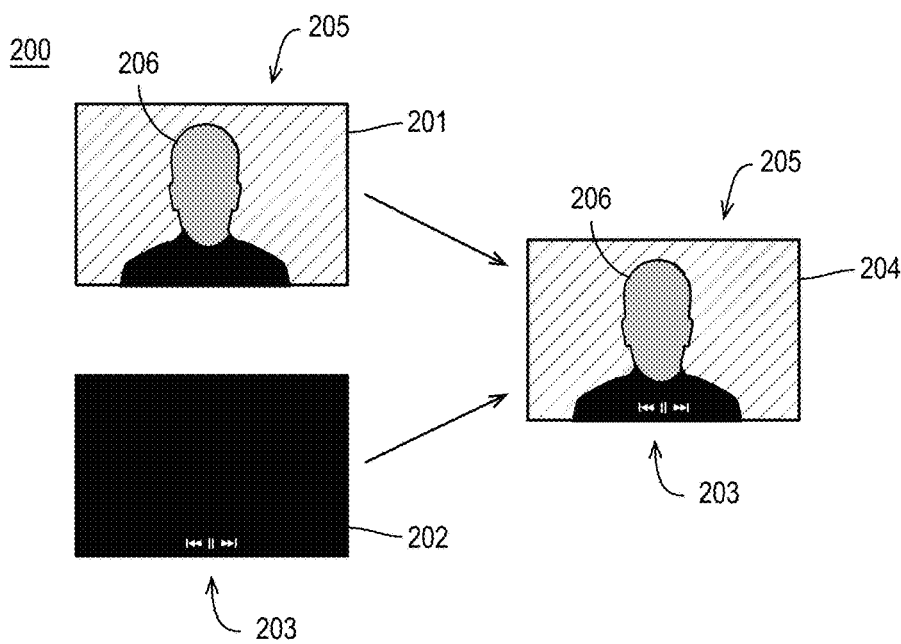
FIG. 2 illustrates an example compositing of example video frames.

FIG. 2 illustrates an example compositing 200 of example video frames 201, 202, arranged in accordance with at least some implementations of the present disclosure. As shown in FIG. 2, video frames 201, 202 may be composited to generate composited video frame 204. In the illustrated example, video frame 201 may be a frame of a main video content of interest and video frame 202 may include user interface information. However, as discussed, any video content or frames may be composited using the techniques discussed herein. Furthermore, in the illustration of FIG. 2, two sources of video frames 201, 202 are illustrated, however the techniques discussed herein may composite any number of video content sources such as three or more video content sources. As used herein, a video frame or a surface may include pixel data or other image or video data that may be composited or processed for encoding, rendering for display, or the like.

As shown, video frame 201 may include main video content of interest such as a scene 205 including a subject 206. Video frame 201 may include any suitable scene, subjects, number of subjects, or the like. Furthermore, video frame 202 may include user interface content 203 and, outside of user interface content 203, video frame 202 may be transparent (e.g., represented as black with respect to video frame 202) such that the alpha channel of such pixel data may represent transparency (e.g., via a bit value of 1 or 0). For example, in video frame 202, black regions may represent transparent pixels and white regions (e.g., as associated with user interface content 203) may represent non-transparent pixels. Such transparency or non-transparency may be represented via an alpha channel of the color space of video frame 202, for example. Furthermore, such pixels (e.g., transparent or non-transparent pixels) may also have color channel values (e.g., RGB values in the RGBA color space). In the context of transparent pixels, such color channel values may not need to be blended with associated pixel data of video frame 201 since the alpha channel values (e.g., A values in the RGBA color space) indicate full transparency. However, for non-transparent pixels (e.g., non fully transparent pixels), such color channel values may need to be blended (e.g., based on the color channel values and/or the alpha channel value) since the pixel is non-transparent. As discussed, in some examples, the portion of transparent areas or regions of video frame 202 may be substantial. For example, 90% or 95% or the like of video frame 202 may be transparent.

Such pixel blending may include any suitable blending, compositing, or overlay such as pre-multiplied per-pixel alpha blending or the like. For example, such blending may be performed as shown in Equation (1):

$$D_{rgba} = S_{rgba} \cdot P_a + D_{rgba} \cdot (1 - S_a \cdot P_a) \qquad (1)$$

where $D_{rgba}$ may be the blended output value for the pixel, $S_{rgba}$ may be pixel values for the input of a pixel of video frame 202, $P_a$ may be the alpha value for the input of a pixel of video frame 202 (e.g., a floating point value ranging from 0 to 1), and $S_a$ may be pixel values for the input of a pixel of video frame 202. For example, in Equation (1), a $P_a$ value of 0 may mean the pixel of video frame 202 is transparent and a $P_a$ value of 1 may mean the pixel of video frame 202 is fully non-transparent. For example, Equation (1) may provide for blending RGBA content of video frame 202 and YUV content of video frame 201. Although provided with respect to compositing two video sources, Equation (1) may be extended to composite three or more video sources.

As is discussed further herein, the processing associated with Equation (1) (e.g., pre-multiplied per-pixel alpha blending) may be skipped for regions of video frames 201 and 202 based on transparency data (e.g., a transparency map, bit plane, or the like) associated with video frame 202. In regions having at least one non-transparent pixel, such processing may be performed. For example, some pixels of such regions may be transparent and pre-multiplied per-pixel alpha blending may return the pixel value of video frame 201 for such pixels.

As shown, composited video frame 204 may include scene 205 composited with user interface content 203. In the illustrated example, user interface content 203 substantially overlays scene 205 for the sake of clarity of presentation. However, user interface content 203 may be blended with scene 205 to generate any suitable viewing during display of video frame 204 to a user via a display device.

Figure 3:
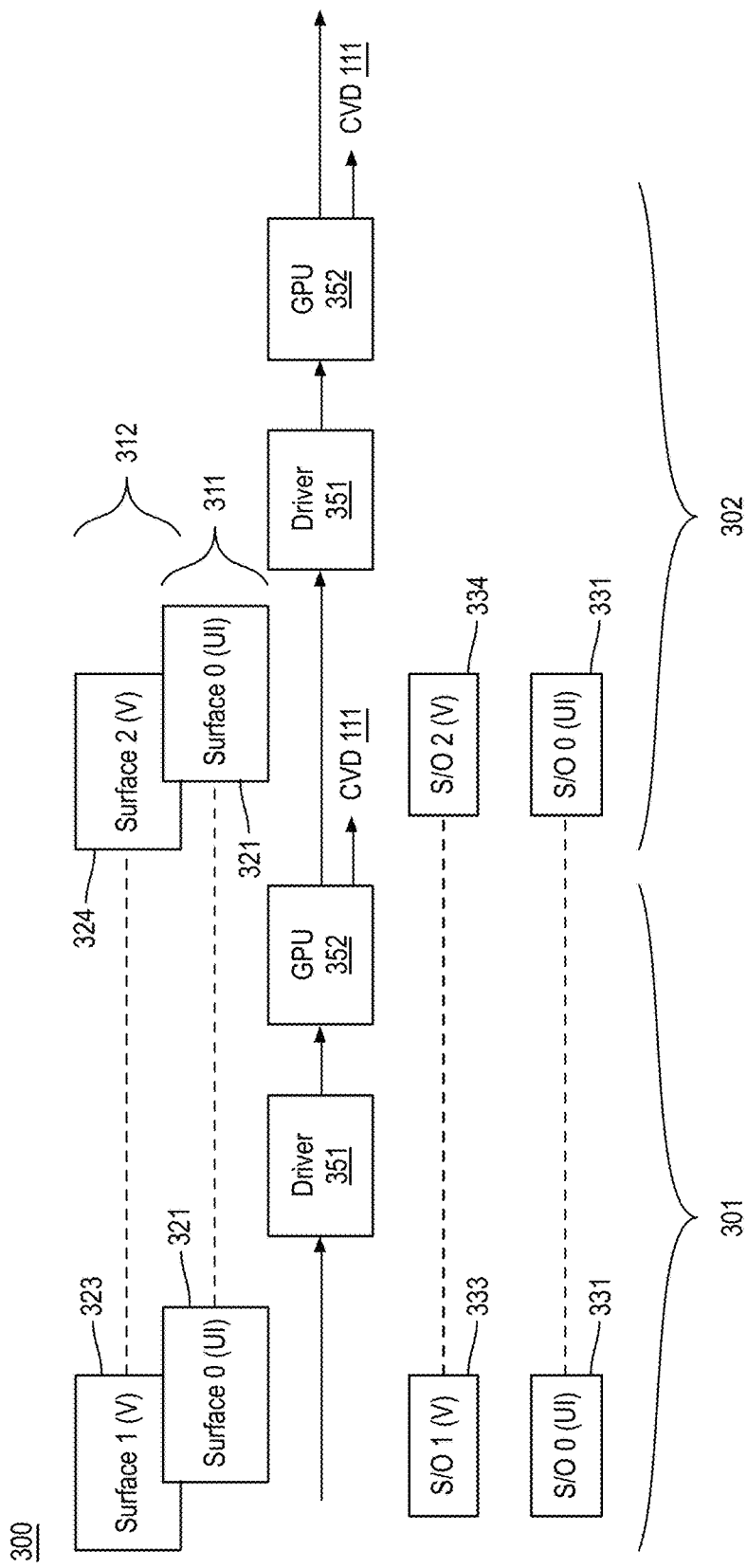
FIG. 3 illustrates an example video composition pipeline.

FIG. 3 illustrates an example video composition pipeline 300, arranged in accordance with at least some implementations of the present disclosure. As shown in FIG. 3, a driver 351 and a graphics processor or graphics processing unit (GPU) 352 may perform multiple composition operations including a composition operation 301 and a composition operation 302 to composite video content including video content 311 and video content 312. For example, video content 311 may include frames or surfaces 321, 321 of user interface video content or the like and video content 312 may include frames or surfaces 323, 324 of video content that is of main interest or the like. For example, video content 311 may be video content 101 or video content 102 or the like and video content 312 may be video content 103 or the like as discussed herein.

Video composition pipeline 300 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform. Furthermore, video composition pipeline 300 may be implemented or utilized in a variety of contexts such as camera preview contexts (e.g., such that composited video data 111 may be presented to a user via display 105, please refer to FIG. 1), wireless display contexts (e.g., such that composited video data 111 may be encoded via encoder 106 and transmitted to a remote display, please refer to FIG. 1), video playback via a web browser or other application (e.g., such that composited video data 111 may be presented to a user via display 105, please refer to FIG. 1), or the like.

For example, a surface allocation or surface buffer or the like may be provided via memory (not shown) for a surface of video content 312. For example, at composition operation 301 the surface allocation for video content 312 may include frame or surface 323 labeled as Surface 1 (V) and, at composition operation 302, the surface allocation for video content 312 may include frame or surface 324 labeled as Surface 2 (V) with the change from Surface 1 to Surface 2 indicating a change has occurred between composition operations 301, 302. Similarly, a surface allocation or surface buffer or the like may be provided via memory for a surface of video content 311. For example, at composition operation 301 the surface allocation may include frame or surface 321 labeled as Surface 0 (UI) and, at composition operation 302, the surface allocation for video content 311 may include frame or surface 321 and labeled as Surface 0 (UI) with no change from Surface 0 to Surface 0 indicate no change has occurred between composition operations 301, 302. The changes between composition operations 301 and 302 are selected for illustrative purposes and are not meant to be limiting.

Furthermore, a stream out buffer allocation or stream out buffer or the like may be provided via memory for transparency data associated with video content 312. For example, at composition operation 301, the stream out buffer for video content 312 may include transparency data 333 labeled as stream out (S/O) 1 (V). At composition operation 302, the stream out buffer for video content 312 may include transparency data 334 labeled as S/O 2 (V) with the change from S/O 1 to S/O 2 indicating the change in surfaces between composition operations 301, 302. Similarly, a stream out buffer allocation or stream out buffer or the like may be provided via memory for transparency data associated with video content 311. For example, at composition operation 301, the stream out buffer for video content 311 may include transparency data 331 labeled as S/O 0 (UI) and, at composition operation 302, the stream out buffer for video content 311 may include transparency data 331 labeled as S/O 0 (UI) with no change from S/O 0 to S/O 0 indicating the change in surfaces between composition operations 301, 302.

As shown, video composition pipeline 300 may provide a stream out based composition technique for composing video content 311, 312. For example, at composition operation 301, GPU 352 may, under control of driver 351, generate transparency data 331 associated with surface 321 of video content 311 and transparency data 333 associated with surface 323 of video content 312. Furthermore, at composition operation 301, GPU 352 may generate composite video data 111 by compositing surface 323 and surface 321 based on transparency data 333, 331 as is discussed further herein. For example, GPU 352 may skip blending in transparent regions of one surface and copy the associated regions from the other surface and GPU 352 may blend regions that are non-transparent in both surfaces. For example, if a region of surface 321 is transparent as indicated via a transparency indicator (e.g., an indicator bit) of transparency data 331, for that region, blending may be skipped and the associated region of surface 323 may be copied (e.g., without further processing) for inclusion in composite video data 111. Such copying may be performed for all pixels within the transparent region for example. If a region of surface 321 is non-transparent as indicated via a non-transparency indicator (e.g., an indicator bit) of transparency data 331 and the associated region of surface 323 is also non-transparent, GPU 352 may perform blending such as blending via Equation (1) or the like. For example, such blending may be performed for all pixels within the non-transparent region.

At composition operation 302, driver 351 may indicate a change to video content 312 (e.g., surface 323 changing to surface 324) but no change to video content 311 (e.g., surface 321 being unchanged). Such change detection may be performed using any suitable technique or techniques such as via middleware running on a central processor or the like (not shown). Based on a change to video content 312, GPU 352 may, at composition operation 302, generate updated transparency data 334. However, since no change to video content 311 has been detected, no update to transparency data 331 may be made. Furthermore, at composition operation 302, GPU 352 may generate composite video data 111 by compositing surface 323 and surface 321 based on transparency data 333, 331 as discussed with respect to composition operation 301 and elsewhere herein.

For example, if a region of surface 321 at composition operation 302 is transparent as indicated via a transparency indicator (e.g., an indicator bit) of transparency data 331 at composition operation 302, for that region, blending may be skipped and the associated region of surface 324 may be copied (e.g., without further processing) for inclusion in composite video data 111 at composition operation 302. Such copying may be performed for all pixels within the transparent region for example. If a region of surface 321 at composition operation 302 is non-transparent as indicated via a non-transparency indicator (e.g., an indicator bit) of transparency data 331 at composition operation 302 and the associated region of surface 324 is also non-transparent, GPU 352 may perform blending such as blending via Equation (1) or the like. For example, such blending may be performed for all pixels within the non-transparent region.

As discussed, video content 312 may be updated frequently (e.g., at 30 fps or more) such that the associated surface is updating at all or nearly all composition operations. Furthermore, video content 312 may include no or very little transparent pixels and, in some examples, video content 312 may not even be capable of indicating transparent pixels (e.g., in YUV examples). In such examples, transparency data 333, 334 may be a single bit indicating non-transparency for the entirety of their associated surfaces for example. In contrast, video content 311 may be updated infrequently (e.g., at 1 fps or less) such that the associated surface is updating at very few composition operations. Furthermore, video content 311 may include a substantial number transparent pixels (e.g., 90%, 95%, or even 100% transparency). In such contexts, generating transparency data only upon a change to an associated surface of video data and using such transparency data to skip blending processing on regions of the associated surface may save substantial computing resources and power.

The mapping between surfaces and transparency data (e.g., between surface 323 and transparency data 333, between surface 321 and transparency data 331, and so on) may include any suitable mapping such as mappings based on blocks, rows of blocks, regions, slices, or the like of the surface. Furthermore, the transparency data may include any suitable data for representing the mapping and associated transparency/non-transparency of the blocks, rows of blocks, regions, slices, or the like. For example, a bit indicator may be assigned for each block, row of blocks, region, slice, or the like in some examples. Such bit indicators may be further compressed using run length encoding or other techniques.

Figure 4:
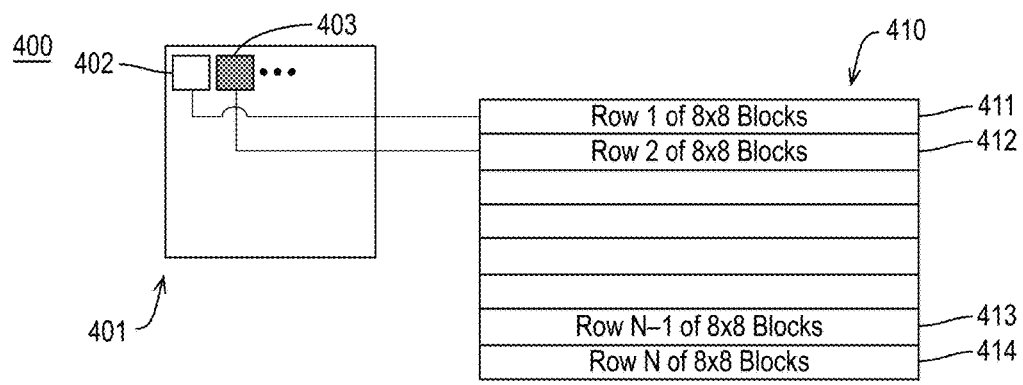
FIG. 4 illustrates an example bit mapping between example transparency data and an example surface.

FIG. 4 illustrates an example bit mapping 400 between example transparency data 401 and an example surface 410, arranged in accordance with at least some implementations of the present disclosure. A shown in FIG. 4, in some examples, transparency data 401 may include a plurality of indicators (e.g., indicator bits) such as transparency indicator 402 (e.g., illustrated via a white box) and non-transparency indicator 403 (e.g., illustrated via a gray box) such that each indicator is associated with a row of blocks of surface 410 such as row of blocks 411 and row of blocks 412, respectively. As used herein, a transparency indicator may indicate a fully transparent region, row of blocks, block, surface, or the like and a non-transparency indicator may indicate a region, row of blocks, block, surface, or the like having at least on non-transparent pixel. Furthermore, the bit mappings discussed herein (e.g., bit mappings 400, 500, 600, or the like may be provided between any surface and any transparency data discussed herein).

As discussed, in some examples, a transparency indicator may indicate no alpha blending is required and a non-transparency indicator may indicate alpha blending is required. In the illustrated example, each row of blocks includes a row of 8×8 blocks (e.g., blocks having 64 pixels). In such an example, a 1920×1080 surface may require 1080/8=135 indicators. Furthermore, in such examples, a non-transparency indicator may provide for the skipping of blending operations for 1920×8=15,360 pixels. However, each row of blocks may include a row of any sized blocks such as 4×4 blocks, 16×16 blocks, or the like. Furthermore, the rows of blocks may have the same size or they may have different (e.g., programmable) sizes. As shown, surface 410 may be divided into any number of rows of blocks such as N rows of blocks. In the example of FIG. 4, transparency data 401 may include a number of indicators equal to the number of rows of blocks (e.g., transparency data 401 may include N indicator bits).

As discussed, at a composite operation, rows of blocks associated with a transparency indicator (e.g., row of blocks 411 associated with transparency indicator 402) may be skipped such that pixel data for the row of blocks in composited image data may be copied from associated pixel data from an associated surface (e.g., a surface with which surface 410 is being composited) without blending. Rows of blocks associated with a non-transparency indicator (e.g., row of blocks 412 associated with transparency indicator 402) may be blended such that pixel data of the row of blocks is blended with associated pixel data from an associated surface (e.g., a surface with which surface 410 is being composited) based on a blending technique such as the blending technique discussed with respect to Equation (1).

Figure 5:
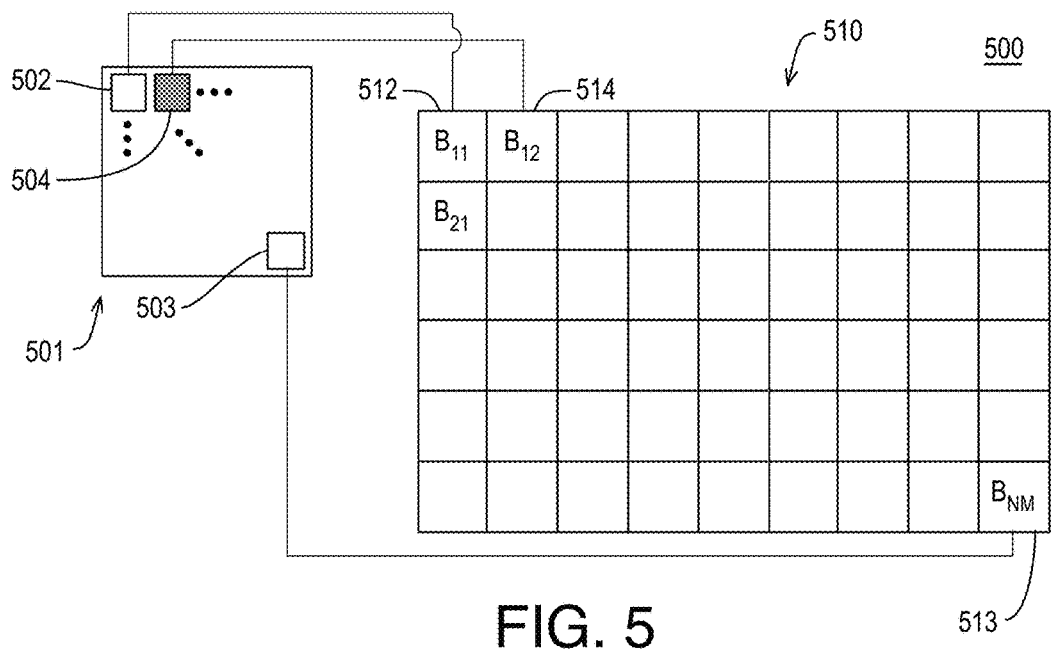
FIG. 5 illustrates an example bit mapping between example transparency data and an example surface.

FIG. 5 illustrates an example bit mapping 500 between example transparency data 501 and an example surface 510, arranged in accordance with at least some implementations of the present disclosure. A shown in FIG. 5, in some examples, transparency data 501 may include a plurality of indicators (e.g., indicator bits) such as transparency indicators 502, 503 (e.g., illustrated via a white box) and non-transparency indicator 504 (e.g., illustrated via a gray box) such that each indicator is associated with a block of surface 510 such as blocks 512, 513, 514, respectively. Blocks of surface 510 may have any suitable size such as 4×4 pixels, 8×8 pixels, 16×16 pixels, or the like. For example, for a surface segmented into 8×8 blocks, a 1920×1080 surface may require 1920×1080/64=32,400 indicators. Furthermore, the blocks of surface 510 may have the same size or they may have different (e.g., programmable) sizes. As shown, surface 510 may be divided into any blocks such as N×M blocks (e.g., the blocks of surface 510 may be labeled as blocks BNM as shown in FIG. 5 where, N indicates the row and M indicates the column of the block). Also, transparency data 501 may include a number of indicators equal to the number of blocks (e.g., transparency data 501 may include N×M indicator bits).

As discussed, at a composite operation, blocks associated with a transparency indicator (e.g., blocks 512, 513 associated with transparency indicators 502, 503, respectively) may be skipped such that pixel data for blocks in composited image data may be copied from associated pixel data from an associated surface (e.g., a surface with which surface 510 is being composited) without blending. Blocks associated with a non-transparency indicator (e.g., block 514 associated with transparency indicator 504) may be blended such that pixel data of the block is blended with associated pixel data from an associated surface (e.g., a surface with which surface 510 is being composited) based on a blending technique such as the blending technique discussed with respect to Equation (1).

Figure 6:
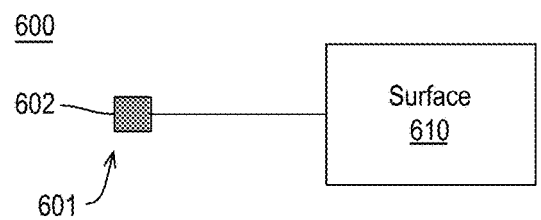
FIG. 6 illustrates an example bit mapping between example transparency data and an example surface.

FIG. 6 illustrates an example bit mapping 600 between example transparency data 601 and an example surface 610, arranged in accordance with at least some implementations of the present disclosure. A shown in FIG. 6, in some examples, transparency data 601 may include a single indicator 602 (e.g., an indicator bit) illustrated as a non-transparency indictor via gray box. For example, single indicator 602 may indicate a transparency or non-transparency of the entirety of surface 610. In operation, when surface 610 is associated with a transparency indicator, blending may be skipped with respect to surface 610 such that pixel data for a composited image data may be copied from an associated surface (e.g., a surface with which surface 510 is being composited) in its entirety without blending. When surface 610 is associated with a non-transparency indicator, pixel data of surface 610 may be blended with pixel data from an associated surface (e.g., a surface with which surface 610 is being composited) based on a blending technique such as the blending technique discussed with respect to Equation (1).

In some examples, bit mapping 600 may be used when surface 610 is in a color space without an opacity (e.g., alpha) channel. In such examples, surface 610 may always be non-transparent. Furthermore, an associated stream out buffer may be a single bit having a value of 1 indicating blending is always required for such a surface.

As discussed, the techniques discussed herein may provide for computationally efficient and low power video content composition techniques. For example, the techniques discussed herein may generate transparent statistic information for each block (e.g., transparency data as stored via a stream out buffer) and then reuse it for subsequent compositions if the same surface is still present. By using such previously generated transparency data, if any block of the surface is fully transparent, blending operations may be bypassed saving computational workload and execution time (e.g., for a GPU or the like). For example, as discussed with respect to FIG. 3 as surface 321 (e.g., labeled as Surface 0 (UI) is still present at composition operation 302, a previously updated stream out buffer including associated transparency data 331 may be leveraged at composition operation 302. Such transparency data may be reused until a change is detected and the transparency data may be updated for continued reuse and leveraging as discussed herein.

Figure 7:
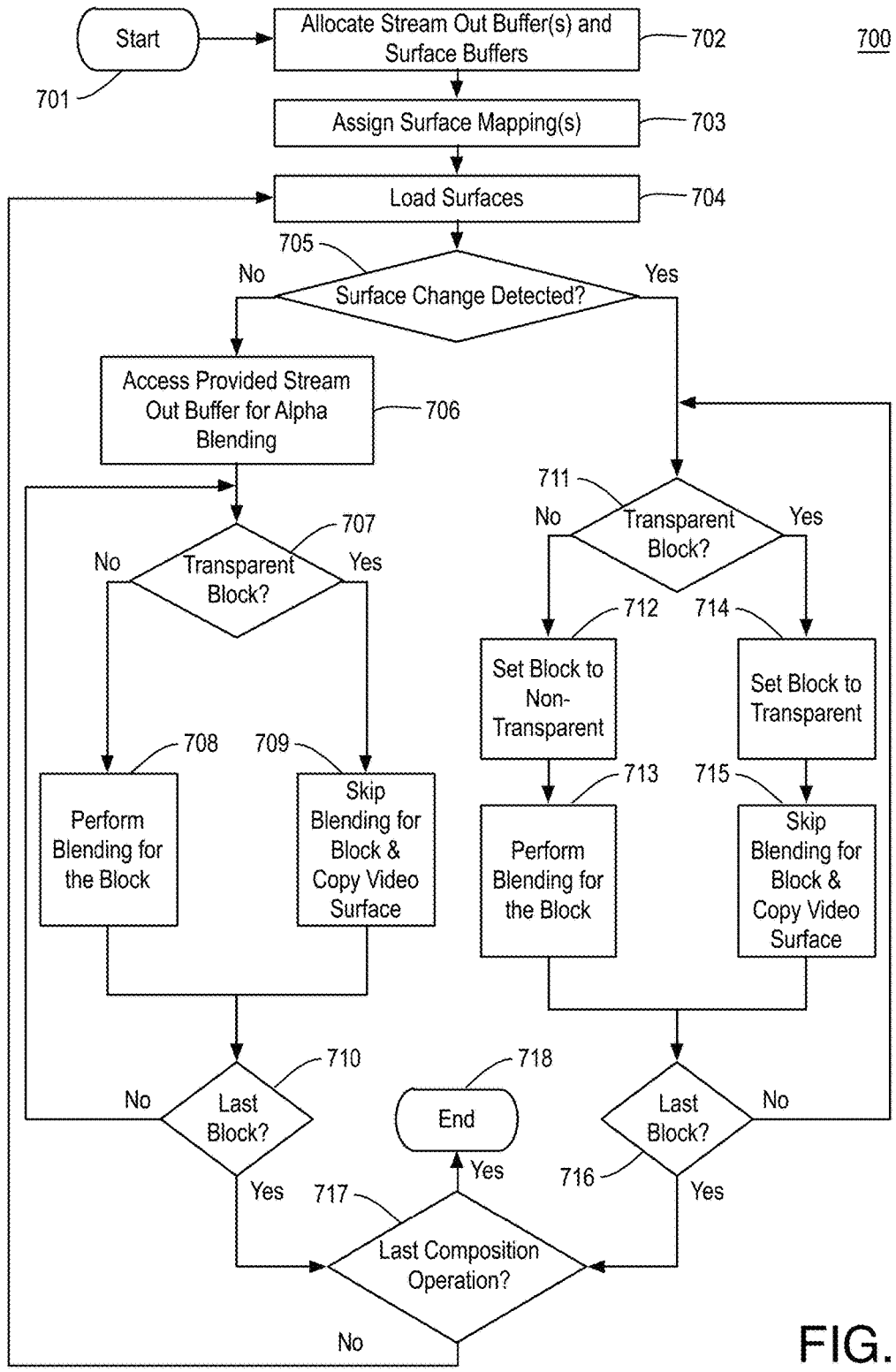
FIG. 7 is a flow diagram illustrating an example process for compositing video content.

FIG. 7 is a flow diagram illustrating an example process 700 for compositing video content, arranged in accordance with at least some implementations of the present disclosure. Process 700 may include one or more operations 701-718 as illustrated in FIG. 7. Process 700 may be performed by a device or system (e.g., system 900, system 1000, device 11000, or any other devices, systems, or subsystems discussed herein) or portions of process 700 may be performed to composite video content. Process 700 or portions thereof may be repeated for any number of video content compositions, image frame compositions, or the like.

As shown, process 700 may begin from start operation 701 at operation 702, "Allocate Stream Out Buffer(s) and Surface Buffers", where at least one stream out buffer and two or more surface buffers may be allocated. Such buffer allocations may be performed via a graphics driver or the like such as driver 351. For example, with reference to FIG. 3, a surface buffer associated with surfaces 321, 322 of video content 311 and a surface buffer associated with surfaces 323, 324 of video content 312 may be allocated via memory. Furthermore, a stream out buffer associated with transparency data 331 as associated with video content 311 may be allocated via memory. In some examples, a stream out buffer may be allocated for a single video source such as a user interface video source, a status bar content video source, or the like. In some examples, the single video source may have an opacity or alpha channel such as those provided via the RGBA color space or the like. For example, if the other video source does not have an opacity channel, a stream out buffer may be optionally allocated at operation 701 (e.g., a stream out buffer associated with transparency data 333, 334 as associated with video content 312). For example, such a stream out buffer may contain a single bit indicating the entire surface is non-transparent as discussed herein with respect to FIG. 6. In other examples, the allocation of such a stream out buffer may be skipped and a flag or the like may be set to indicate such video content has no opacity channel associated therewith.

As used herein, a stream out buffer may be any suitable buffer or memory space or the like. For example, a stream out buffer may be a small portion or chunk of memory that is bounded to its associated surface buffer. As discussed, each bit of the transparency data contained within the stream out buffer may indicate whether a corresponding region or the like of the associated surface is fully transparent or not. In some examples, GPU hardware such as GPU 352 may update the stream out buffer as needed upon completing transparency data for a surface.

Processing may continue at operation 703, "Assign Surface Mapping(s)", where one or more surface mappings or divisions may be assigned or generated. For example, the surface mapping may provide a mapping between the stream out buffer format (e.g., transparency data format) and the associated surface. For example, the surface mappings or bit mappings may be performed via a graphics driver or the like such as driver 351 based on the hardware capabilities of an associate graphics processor such as GPU 352. In some examples, a graphics driver may perform operations 702 and 703 substantially simultaneously for example. The mapping or division of the surface may include any suitable mapping such as those discussed with respect to FIGS. 4-6. As discussed, in some examples, the mapping or division may provide predetermined mappings (e.g., the entire surface is divided in to 8×8 blocks or the like) and, in other examples, the mapping or division may provide for variable block sizes or rows of blocks or the like. In such examples, the transparency data may provide partition indicators or data or the like to indicate the partition or division associated with a current surface.

Processing may continue at decision operation 704, "Load Surfaces", where two or more surfaces or frames of video data may be loaded for compositing. For example, a first surface of first video content and a second surface of second video content may be loaded for compositing. The surfaces may be loaded to their respective surface buffers as allocated via operation 702. Furthermore, at a first pass though operation 704, no associated transparency data may be available in the allocated stream out buffers. In some examples, pre-processing may be performed to generate such transparency data (e.g., as discussed with respect to operations 711-716) and load it to the allocated stream out buffers.

Processing may continue at decision operation 705, "Surface Change Detected", where a determination may be made as to whether a surface change has been detected. For example, the surface change may be detected based on an analysis of the alpha channel of a surface or the like. In some examples, the change detected may be based on a change to a user interface of status bar surface as discussed herein. For example, detection may be performed for surfaces being composited with a main video source. In some examples, the surface change may be detected via middleware operating on a central processor, via a hardware abstraction layer, or the like. Furthermore, during a first pass through decision operation 705, a change may be detected (e.g., a first surface being evaluated may trigger a composition of associated transparency data). At subsequent passes through operation 706, the determination may be made based on alpha channel analysis, via middleware, or the like. Furthermore the surface change detection may provide a full composition flag to be configured such that a graphics processor may be flagged to generate transparency data and update the stream out buffer as well as perform blending based on the generated transparency data for the current surfaces being composited.

As shown, if a surface change is detected (or if a first pass is being performed), processing may continue at operations 711-716, where a full composition of the two or more frames or surfaces of video content loaded at operation 704 may be performed and where transparency data may be generated for one or both of the two or more frames or surfaces of video content loaded at operation 704. For example, at operations 711-715, user interface video content, menu bar video content or the like in a color space having an opacity channel (e.g., the RGBA color space) may be blended with main video content not having an opacity channel (e.g., the YUV color space). In such contexts, the surface of the video content in the color space having the opacity channel may be divided into blocks or the like, a determination may be made as to whether a block is non-transparent or transparent (and such information may be written to the stream out buffer as transparency data), and the block may be processed according to the determination.

For example, as shown, processing may continue at operation 711, "Transparent Block?", where a determination may be made as to whether a block, a row of blocks, a slice, a region, or the like of the surface in the color space having the opacity channel is transparent or not. For example, a first block, row of blocks, slice, region, or the like as defined via operation 703 may be evaluated to determine whether any of the pixels of the block, row of blocks, slice, region, or the like are non-transparent. If so, the block, row of blocks, slice, region, or the like may be determined to be non-transparent, the block, row of blocks, slice, region, or the like may be set to non-transparent at operation 712 ("Set Block to Non-Transparent"), and a bit indicator indicating non-transparency (e.g. a bit value of 1) may be written for the block, row of blocks, slice, region, or the like to the stream out buffer. If not, the block, row of blocks, slice, region, or the like may be determined to be transparent, the block, row of blocks, slice, region, or the like may be set to transparent at operation 714 ("Set Block to Transparent"), and a bit indicator indicating transparency (e.g. a bit value of 0) may be written for the block, row of blocks, slice, region, or the like to the stream out buffer.

Furthermore, if the block, row of blocks, slice, region, or the like is determined to be non-transparent at decision operation 711, processing may continue from operation 712 at operation 713, "Perform Blending for the Block", where blending may be performed for the block, row of blocks, slice, region, or the like. For example, pixel data for the block, row of blocks, slice, region, or the like of the surface may be retrieved from the surface buffer and associated pixel data for the block, row of blocks, slice, region, or the like of the surface with which the surface is being composited may be retrieved from its surface buffer and the pixel data may be blended using any suitable blending technique or techniques such as the technique discussed with respect to Equation (1). The blended pixel data may be provided as a part of composite video data, for example. For example, for such a non-transparent block, row of blocks, slice, region, or the like, pixel data of main video content (e.g., in YUV) may be composited with pixel data of the user interface video content (e.g., in RGBA) or the like.

If the block is determined to be transparent at decision operation 711, processing may continue from operation 714 at operation 715, "Skip Blending for Block & Copy Video Surface", where blending may be skipped for the block, row of blocks, slice, region, or the like and the pixel data for a surface associated with the surface (e.g., the surface with which the surface is being composited) may be copied. For example, since the block, row of blocks, slice, region, or the like of the surface is fully transparent, it does not need to be taken into account when generating composite video data for the region. Instead, the composite video data may be a copy of the data for the other surface as retrieved form the buffer allocated at operation 702. The copied pixel data may be provided as a part of composite video data, for example. For example, for such a transparent block, row of blocks, slice, region, or the like, pixel data of main video content (e.g., in YUV) may be copied and user interface video content (e.g., in RGBA) or the like may be ignored or skipped.

From operation 713 or operation 715, processing may continue at decision operation 716, "Last Block?", where a determination may be made as to whether the current block, row of blocks, slice, region, or the like of the surface is the last block, row of blocks, slice, region, or the like of the surface. If not, processing may continue at operations 711-715 with an incrementing to the next block, row of blocks, slice, region, or the like of the surface as discussed until a last block, row of blocks, slice, region, or the like is completed.

If processing for the last block, row of blocks, slice, region, or the like has completed, processing may continue at decision operation 717, "Last Composition Operation?", where a determination may be made as to whether a last composition operation has completed. If so (e.g., a video sequence has completed encoding, a camera preview has been shut down, or the like), processing may end at end operation.

If not, processing may continue at operation 704, where a next surface or surfaces may be loaded. For example, a first pass through operation 704 to operation 717 may provide a first composition operation and subsequent passes may provide a plurality of composition operations to composite first and second video content. For example, with respect to FIG. 3, surfaces 321, 323 of video content 311, 312, respectively may be loaded on a first pass through operation 704 and surfaces 321, 324 of video content 311, 312, respectively may be loaded on a second pass through operation 704.

Returning to discussion of decision operation 705, if a surface change has been detected for the surface having an opacity or alpha channel, processing may processed via operations 711-716 as discussed. For example, if no surface change is detected for the surface having an opacity or alpha channel at operation 705, processing may continue at operations 706-710 where the previously generated and saved transparency data may be used to composite the current surfaces loaded at operation 704.

For example, processing may continue at operation 706, "Access Provided Stream Out Buffer for Alpha Blending", where the stream out buffer for the surface having the opacity or alpha channel may be accessed to determine the transparency data associated with the surface.

Processing may continue at operation 707, "Transparent Block?", where a determination may be made as to whether a block, a row of blocks, a slice, a region, or the like of the surface in the color space having the opacity channel is transparent or not. For example, the indicator bit associated with the block, row of blocks, slice, region, or the like may be read to from the stream out buffer to determine whether the block, row of blocks, slice, region, or the like is transparent (e.g., has all transparent pixels and is associated with a transparency indicator) or is non-transparent (e.g., has at least one non-transparent pixel and is associated with a non-transparency indicator).

If the block is determined to be transparent, processing may continue at operation 709, "Skip Blending for Block & Copy Video Surface", where blending may be skipped for the block, row of blocks, slice, region, or the like and the pixel data for a surface associated with the surface (e.g., the surface with which the surface is being composited) may be copied. For example, since the block, row of blocks, slice, region, or the like of the surface is fully transparent, it does not need to be taken into account when generating composite video data for the region. Instead, the composite video data may be a copy of the data for the other surface as retrieved form the buffer allocated at operation 702. The copied pixel data may be provided as a part of composite video data, for example. For example, for such a transparent block, row of blocks, slice, region, or the like, pixel data of main video content (e.g., in YUV) may be copied and user interface video content (e.g., in RGBA) or the like may be ignored or skipped.

If the block is determined to be non-transparent, processing may continue at operation 708, "Perform Blending for the Block", where blending may be performed for the block, row of blocks, slice, region, or the like. For example, pixel data for the block, row of blocks, slice, region, or the like of the surface may be retrieved from the surface buffer and associated pixel data for the block, row of blocks, slice, region, or the like of the surface with which the surface is being composited may be retrieved from its surface buffer and the pixel data may be blended using any suitable blending technique or techniques such as the technique discussed with respect to Equation (1). The blended pixel data may be provided as a part of composite video data, for example. For example, for such a non-transparent block, row of blocks, slice, region, or the like, pixel data of main video content (e.g., in YUV) may be composited with pixel data of the user interface video content (e.g., in RGBA) or the like.

From operation 708 or operation 709, processing may continue at decision operation 710, "Last Block?", where a determination may be made as to whether the current block, row of blocks, slice, region, or the like of the surface is the last block, row of blocks, slice, region, or the like of the surface. If not, processing may continue for a next block, row of blocks, slice, region, or the like at operations 707-709 as discussed until a last block, row of blocks, slice, region, or the like is completed.

If processing for the last block, row of blocks, slice, region, or the like has completed, processing may continue at decision operation 717, where a determination may be made as to whether a last composition operation has completed as discussed. If so, processing may end at end operation and, if not, processing may continue at operation 704, where a next surface or surfaces may be loaded as discussed. For example, if no change to the surface having the opacity or alpha channel is detected, processing may continue via operations 706-710 with no change or update to the transparency data as stored via the discussed stream out buffer. Once a change is detected, processing may continue via operations 711-716 where the transparency data may be updated and stored via the discussed stream out buffer, and the newly updated transparency may be used for the current surface and any unchanged subsequent surfaces.

As discussed, process 700 may be used to composite video content. Process 700 may be performed in parallel or in series for any number of video content compositions, image frame compositions, or the like. In some examples, process 700 may be evoked by a driver or the like to composite video content.

The discussed operations have been described with respect to processing entire surfaces. In other examples, an instruction call may be generated including an instruction to process only a portion of the described surfaces. For example, the transparency data may be analyzed to determine a portion of the surfaces may be skipped processing without further analysis of the transparency data. Such examples may be particularly advantageous when the video content includes regions that are rarely or never composited and other regions that are often composited such as subtitle content being provided in a consistent bottom portion of the video content or the like. For example, with reference to FIG. 4, in some examples, subtitles may only appear in lower rows of blocks 413,414 of surface 410 such as Row N and Row N−1 or the like. Similar regions of other surface divisions (e.g., bottom rows of blocks of surface 510 as shown with respect to FIG. 5) may determined. In such examples, an instruction call to perform video compositing may include a call only to process Rows N and N−1 with other rows to be copied without bitwise analysis of transparency data 401.

For example, since each bit of transparency data 401 as stored in the stream out buffer may indicate whether the associated region (e.g., rows of blocks of surface 410) of the surface (e.g., an RGBA surface) is full transparent or not, such transparency data 401 may be accessed by an application (e.g., implemented via driver 351 or an application implemented via a central processor) to determine subtitle regions, control user interface regions, or the like. The application may then instruct a graphics processor (e.g., GPU 352) to perform composition for a specific portion of the surface instead of the entire surface. Such an instruction call may save extra GPU computing time and power.

Continuing the example of FIG. 4, each bit of transparency data 401 may provide an transparency indicator for a row of 8×8 blocks (e.g., such as row of blocks 411, 412, 413, 414 and so on) and in the above example, only the last two rows of blocks 413, 414 (e.g., Rows N and N−1) are not transparent (e.g., include subtitle content whereas other rows of blocks are fully transparent). The application may generate an instruction call that instructs the GPU to perform composition only for the region or portion associated with rows of blocks 413, 414 (e.g., Rows N and N−1). For example, the instruction call may include a call for compositing a region or portion of surface 410 defined by the pixels of rows of blocks 413, 414 (e.g., Rows N and N−1). For example, the process call may recite a process region (x=0, y=40, w=width, h=16), where x=0, y=40 indicates a start of processing at the top left corner of Row N−1 and w=width, h=16 indicates processing across a full width of surface 410 and a height of only 16 pixels (e.g., to the bottom right corner of Row N). Such an instruction call may be contrasted with a full surface instruction call that may recite process region (x=0, y=0, w=width, h=height), which may indicate full processing of surface 410.

Furthermore, video composition techniques have typically been discussed with respect to two sources of video content. However, the discussed video composition techniques may be extended to three or more sources of video content. For example, any number of surface buffers and associated stream out buffers may be allocated for any number of sources of video content. Any number of transparency data sets may be generated for the sources of video content and changes across any number of sources of video content may be tracked. For example, one source of the sources of video content may be a main content source and others may be characterized as secondary content sources. In such examples, transparency data may be generated and retained for such secondary content sources until a change occurs in the video content of the secondary content sources. Furthermore, at composition operations, regions having full transparency across such secondary content sources may be copied from the main content source and compositing operations may be skipped. For regions having non-transparency for any of the secondary content sources, blending may be performed using such pixel data from the main content source and any non-transparent secondary content sources.

The techniques discussed herein provide low power consumption for devices or platforms such as mobile platforms. For example, the discussed techniques may provide higher level software stack control for hardware optimization. Such optimizations may save about 60% execution time (e.g., via a GPU or the like), which may translate to about 60% saved power in operation. Such savings may be particularly advantageous in mobile settings and in mobile devices where battery life is an important performance factor.

For example, in an example implementation compositing first video content of a video layer having YUV pixel data at 1920×1080 resolution and second video content of a video layer having RGBA pixel data at 1920×1080 resolution but only including subtitle content (e.g., with the remaining portion of the surface being transparent), the described techniques may reduce processing time. For example, using legacy techniques, compositing such frames may take about 9.3 ms using a state of the art platform. Using techniques discussed herein with a stream out buffer and corresponding transparency data representing the entirety of the second video content, the frames may be composited in 3.2 ms, saving about 66% of computing time. Furthermore, using an instruction call to limit the processing only to frame data within the subtitle portion (e.g., as discussed with respect to rows of blocks 413, 414, for example, please refer to FIG. 4), the frames may be composited in 1.2 ms. Such computational savings may provide for the processor (e.g., a GPU) to save power via less operation time and/or via having the opportunity to enter deeper power savings modes when inactive.

Figure 8:
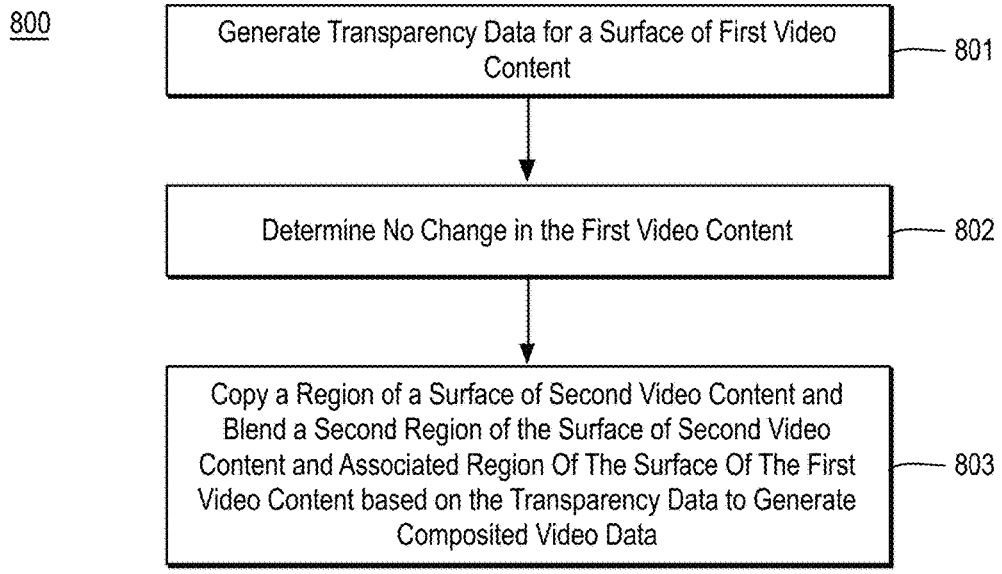
FIG. 8 is a flow diagram illustrating an example process for compositing video content.

FIG. 8 is a flow diagram illustrating an example process 800 for compositing video content, arranged in accordance with at least some implementations of the present disclosure. Process 800 may include one or more operations 801-803 as illustrated in FIG. 8. Process 800 may form at least part of a video compositing process. By way of non-limiting example, process 800 may form at least part of a video compositing process as performed by any device or system as discussed herein. Furthermore, process 800 will be described herein with reference to system 900 of FIG. 9.

Figure 9:
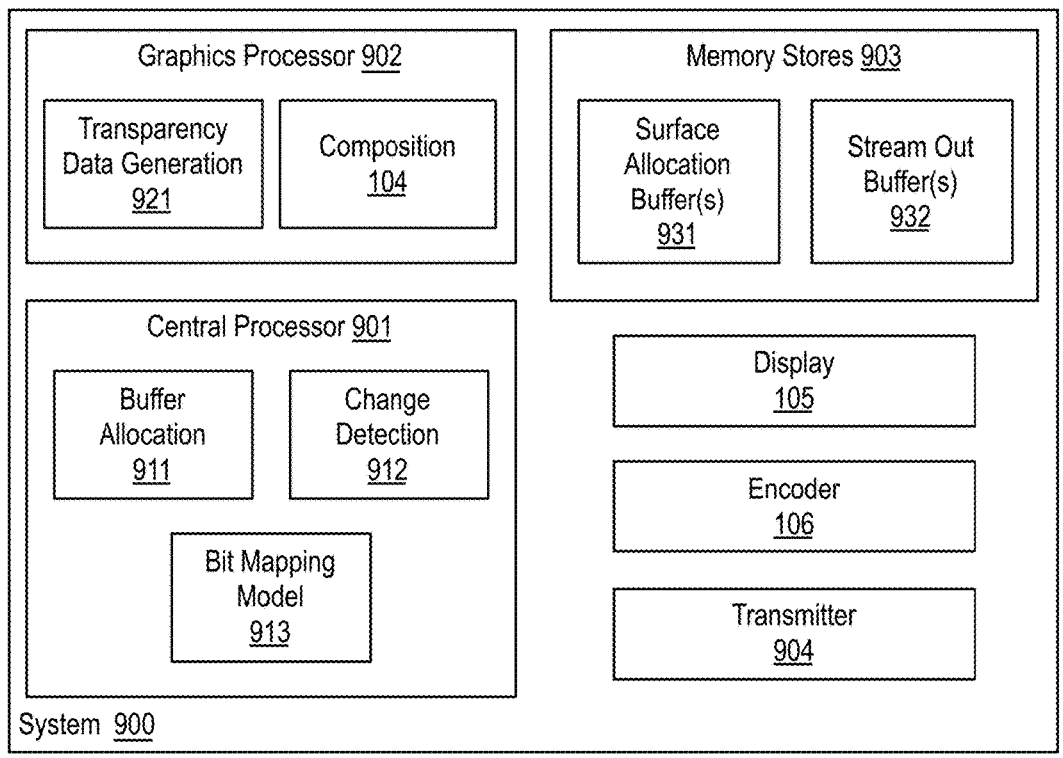
FIG. 9 is an illustrative diagram of an example system 900 for compositing video content.

FIG. 9 is an illustrative diagram of an example system 900 for compositing video content, arranged in accordance with at least some implementations of the present disclosure. As shown in FIG. 9, system 900 may include central processor 901, a graphics processor 902, memory 903, display 105, encoder 106, and a transmitter 904. Also as shown, central processor 901 may include buffer allocation module 911, change detection module 912, and bit mapping model module 913, graphics processor 902 may include transparency data generation module 921 and composition module 104, and memory 903 may include surface allocation buffers 931 and stream out buffers 932. In the example of system 900, memory 903 may also store video data or related content such as pixel data, control data, and/or any other data as discussed herein.

As shown, in some examples, buffer allocation module 911, change detection module 912, and bit mapping model module 913 may be implemented via central processor 901. In other examples, one or more or portions of buffer allocation module 911, change detection module 912, and bit mapping model module 913 may be implemented via graphics processor 902, or another processing unit. Furthermore, as shown, in some examples, transparency data generation module 921 and composition module 104 may be implemented via graphics processor 902. In other examples, one or more or portions of buffer allocation module 911, change detection module 912, and bit mapping model module 913 may be implemented via central processor 901, or another processing unit.

Graphics processor 902 may include any number and type of graphics processing units that may provide the operations as discussed herein. Such operations may be implemented via software or hardware or a combination thereof. For example, graphics processor 902 may include circuitry dedicated to manipulate video frames, video surfaces, transparency data or the like obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of buffer allocation module 911, change detection module 912, and bit mapping model module 913, transparency data generation module 921, or composition module 104 may be implemented via an execution unit (EU) of graphics processor 902. The EU may include, for example, programmable logic or circuitry such as a logic core or cores that may provide a wide array of programmable logic functions. In an embodiment, one or more or portions of buffer allocation module 911, change detection module 912, and bit mapping model module 913, transparency data generation module 921, or composition module 104 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, "Generate Transparency Data for a Surface of First Video Content", where transparency data for a surface off first video content may be generated. For example, at a first composition operation of a plurality of composition operations to composite first video content and second video content, transparency data associated with a surface of the first video content may be generated. For example, transparency data generation module 921 as implemented via graphics processor 902 may generate the transparency data. The first and second video content may include any suitable video content in any suitable color space. In some examples, the second video content may be a main source of video content and the first video content may be a user interface source of video content, a status bar or other operating system based source of video content, or the like. For example, the first video content may be in a color space having an opacity channel and one or more first color channels and the second video content may be in a second color space having only one or more second color channels. The transparency data may include any suitable transparency data as discussed herein. For example, the transparency data may include indicators associated with at least one of blocks of the first surface or rows of blocks of the surface of the first video content. For example, the indicators may be bits or the like indicating transparency or non-transparency of such blocks or rows of blocks. In some examples, second transparency data associated with a second surface of the second video content may also be generated at operation 801 and stored in a stream out buffer.

Furthermore, prior to operation 801, a surface allocation buffer and a stream out buffer associated with the first video content may be allocated in memory. For example, surface allocation buffers 931 and stream out buffers 932 may be allocated in memory 903 for the first and second video content. The buffer allocations may be performed, for example, via buffer allocation module 911 as implemented via central processor 901. In some examples, the transparency data may be stored in stream out buffers 932 prior to operation 801. For example, transparency data generation module 921 as implemented via graphics processor 902 may store the transparency data in stream out buffers 932 as allocated in memory 903. Also, prior to operation 801, a bit mapping model associated with the first video content may be determined.

For example, the bit mapping model may provides a segmentation of the first surface into multiple regions including the region. Furthermore, the transparency data may include an indicator associated with each of the multiple regions. The bit mapping model may include any suitable bit mapping such as those discussed herein. In some examples the bit mapping model may include a variable region size bit mapping model.

Processing may continue at operation 802, "Determine No Change in the First Video Content", where no change in the video content may be detected. For example, from the first composition operation to a second composition operation, no change in the first video content may be determined. For example, change detection module 912 as implemented via central processor 901 may be employed to detect changes between composition operations.

Processing may continue at operation 803, "Copy a Region of a Surface of Second Video Content and Blend a Second Region of the Surface of Second Video Content and Associated Region Of The Surface Of The First Video Content based on the Transparency Data to Generate Composited Video Data", where a region of the surface of the second video content may be copied and a second region of the surface of the second video content may be blended with an associated region of the surface of the first video content based on the transparency data to generate composited video data. For example, at the second video composition operation, a first region of a surface of the second video content may be copied based on a transparency indicator of the transparency data and, at the second video composition operation, a second region of the surface of the second video content may be blended with an associated region of the surface of the first video content based on a non-transparency indicator of the transparency data to generate composited video data. For example, composition module 902 as implemented via graphics processor 902 may implement such copying and blending.

In some examples, operation 803 may include generating an instruction call including an instruction to process only a portion of the surface of the second video content including the second region based on the transparency data. For example, the instruction call may be provided to include a portion where user interface, subtitle, or other content may determined to be located (e.g., via the transparency data) or predetermined to be located (e.g., based on a predefined specification or the like). For example, the instruction call may be generated via an instruction call module (not shown) as implemented via central processor 901.

The composted video data generated at operation 803 may be utilized for any suitable purpose. In some examples, the composited video data may be presented via a display. For example, the composited video data may be displayed to a user via display 105. In some examples, the composited video data may be encoded. For example, the composited video data may be encoded via encoder 106. The encoded composited video data may also be utilized for any suitable purpose. In some examples, the encoded composited video data may be transmitted over a wireless or wired connection to another device. For example, the encoded composited video data may be wirelessly transmitted to a remote display or other device via transmitter 904.

Furthermore, the operations of process 800 may be applied to two video content sources or more. For example, at the first composition operation, second transparency data associated with a surface of third video content may be generated such that the plurality of composition operations are to composite the first video content, the second video content, and the third video content. The first, second, and third video content may include any suitable video content in any suitable color space. In some examples, the second video content may be a main source of video content, the first video content may be a user interface source of video content, and the third source of video content may be a status bar or other operating system based source of video content, or the like. In some examples, at the second video composition operation of the plurality of composition operations, no change in the third video content may be detected. In such examples, at the second video composition operation, a third region of the surface of the second video content may be copied based on a second transparency indicator of the transparency data and a transparency indicator of the second transparency data each associated with the third region of the surface of the second video content. Furthermore, any regions indicated as non-transparent via the transparency data or the second transparency data may be blended as discussed herein.

Also, process 800 may continue for any number of composition operations. For example, subsequent operations with no change in the first video content may be performed as discussed with respect to operation 803. Subsequent operations with a change in the first video content may include, for example, determining, at a third video composition operation of the plurality of composition operations, a change in the first video content and generating, at the third composition operation, second transparency data associated with a second surface of the first video content. Such second transparency data may be reused as discussed with respect to operation 803 to composite the first and second video data until another change is detected in the first video data.

Process 800 may be repeated any number of times either in series or in parallel for any number composition operations, video frames, video surfaces, requests for video encoding or presentment, or the like. As discussed, process 800 may provide for compositing video content. For example, the discussed techniques for compositing video content may provide computationally efficient and low power compositing of video content.

Various components of the systems described herein may be implemented in software, firmware, and/or hardware and/or any combination thereof. For example, various components of system 900, system 1000, or device 1100 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of process 700, process 800 or any operations discussed herein and/or any portions of system 900, system 1000, device 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
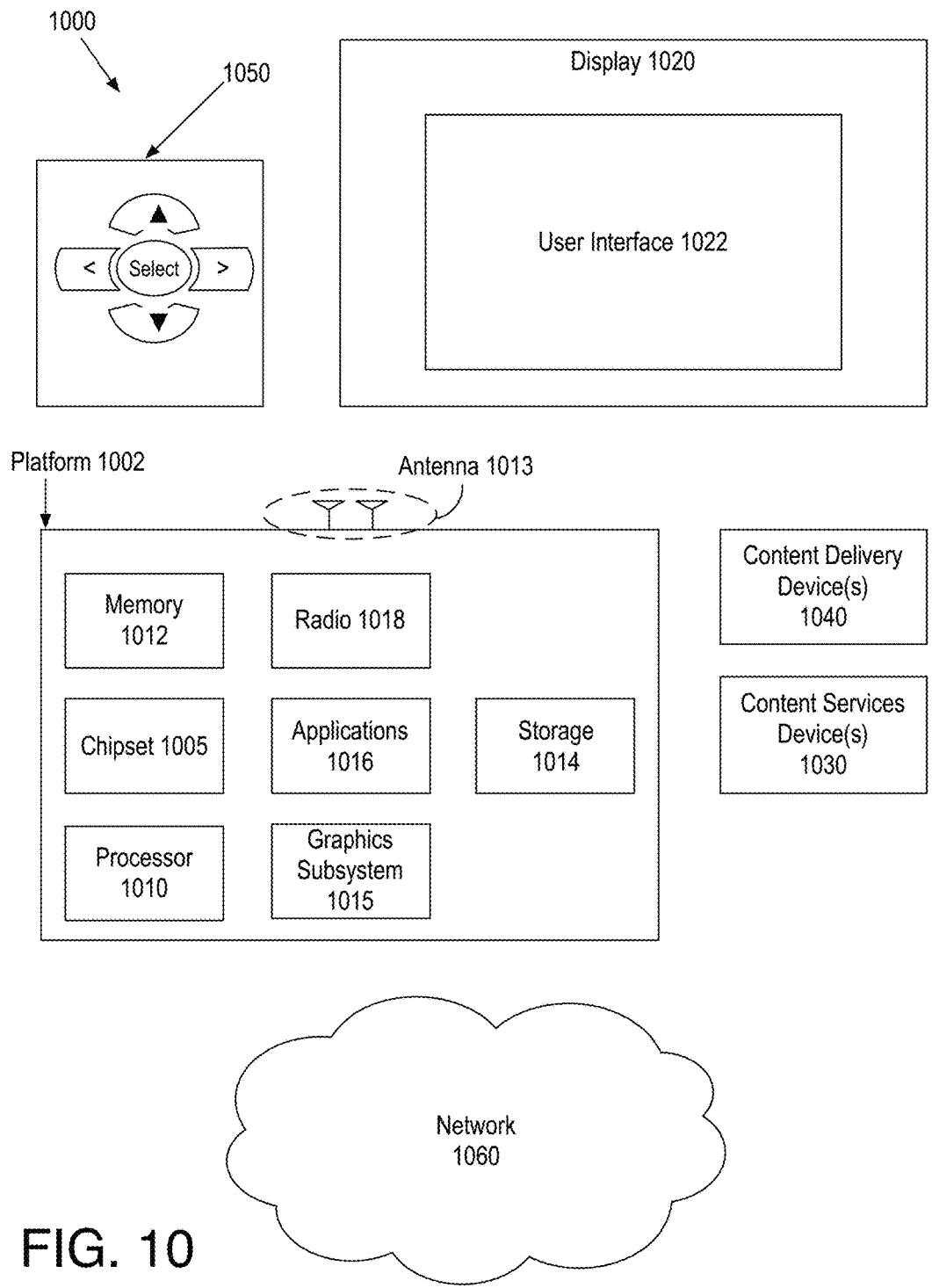
FIG. 10 is an illustrative diagram of an example system.

FIG. 10 is an illustrative diagram of an example system 1000, arranged in accordance with at least some implementations of the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
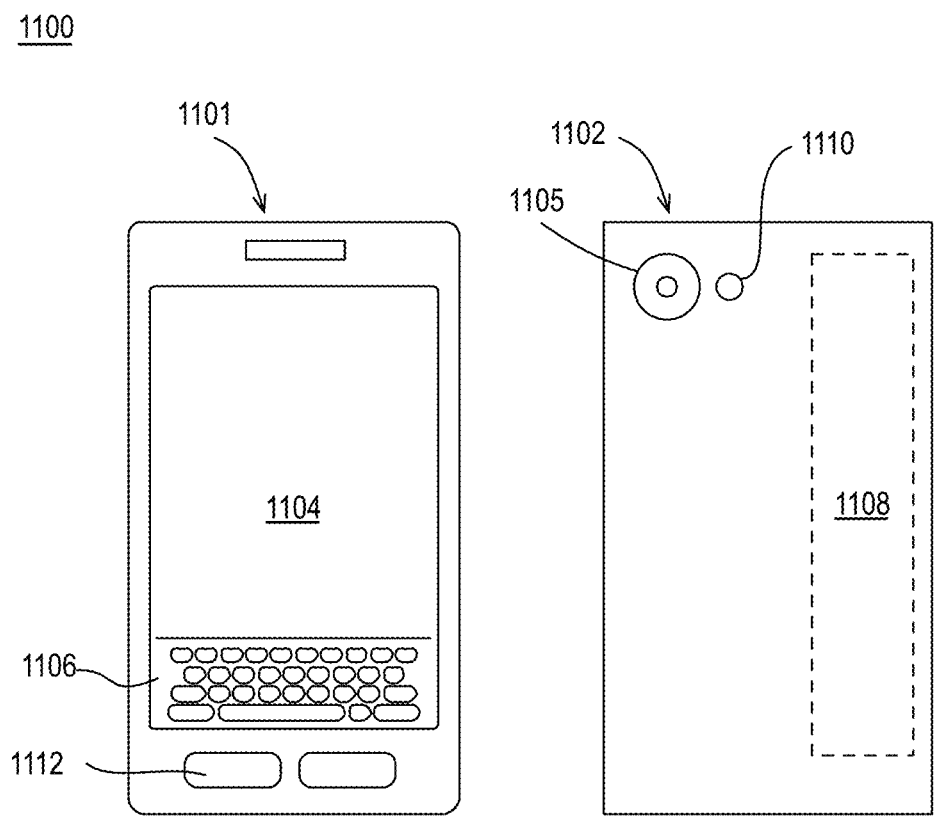
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, device 100, system 900, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, computer-implemented method for compositing video content comprises generating, at a first composition operation of a plurality of composition operations to composite first video content and second video content, transparency data associated with a surface of the first video content, determining, at a second video composition operation of the plurality of composition operations, no change in the first video content, and copying, at the second video composition operation, a first region of a surface of the second video content based on a transparency indicator of the transparency data and blending, at the second video composition operation, a second region of the surface of the second video content with an associated region of the surface of the first video content based on a non-transparency indicator of the transparency data to generate composited video data.

Further to the first embodiments, the method further comprises generating an instruction call comprising an instruction to process only a portion of the surface of the second video content including the second region based on the transparency data.

Further to the first embodiments, the method further comprises allocating, in memory, a surface allocation buffer and a stream out buffer associated with the first video content and storing the transparency data comprising the transparency indicator in the stream out buffer.

Further to the first embodiments, the method further comprises generating second transparency data associated with a second surface of the second video content.

Further to the first embodiments, the first transparency data comprises indicators associated with at least one of blocks of the first surface or rows of blocks of the surface of the first video content.

Further to the first embodiments, the method further comprises presenting the composited video data via a display.

Further to the first embodiments, the method further comprises encoding the composited video data and transmitting the encoded composited video data to a remote display.

Further to the first embodiments, the first video content comprises a color space having an opacity channel and one or more first color channels and the second video content comprises a second color space having only one or more second color channels.

Further to the first embodiments, the method further comprises generating, at the first composition operation, second transparency data associated with a surface of third video content, wherein the plurality of composition operations are to composite the first video content, the second video content, and the third video content, determining, at the second video composition operation of the plurality of composition operations, no change in the third video content, and copying, at the second video composition operation, a third region of the surface of the second video content based on a second transparency indicator of the transparency data and a transparency indicator of the second transparency data each associated with the third region of the surface of the second video content.

Further to the first embodiments, the method further comprises determining, at a third video composition operation of the plurality of composition operations, a change in the first video content and generating, at the third composition operation, second transparency data associated with a second surface of the first video content.

Further to the first embodiments, the method further comprises determining a bit mapping model associated with the first video content, wherein the bit mapping model provides a segmentation of the first surface into a plurality of regions comprising the region, and wherein the transparency data comprises an indicator associated with each of the plurality of regions.

Further to the first embodiments, the method further comprises determining a bit mapping model associated with the first video content, wherein the bit mapping model provides a segmentation of the first surface into a plurality of regions comprising the region, wherein the transparency data comprises an indicator associated with each of the plurality of regions, and wherein the bit mapping model comprises a variable region size bit mapping model.

In one or more second embodiments, a system for compositing video content comprises a memory comprising a surface allocation buffer and a stream out buffer associated with first video content and a graphics processor coupled to the memory, the graphics processor to generate, at a first composition operation of a plurality of composition operations to composite the first video content and second video content, transparency data associated with a surface of the first video content and, at a second video composition operation, to copy a first region of a surface of the second video content based on a transparency indicator of the transparency data and to blend a second region of the surface of the second video content with an associated region of the surface of the first video content based on a non-transparency indicator of the transparency data to generate composited video data.

Further to the second embodiments, the system further comprises a central processor to generate an instruction call comprising an instruction to process only a portion of the surface of the second video content including the second region based on the transparency data and to transmit the instruction call to the graphics processor.

Further to the second embodiments, the system further comprises a central processor to allocate the surface allocation buffer and the stream out buffer associated with the first video content, to allocate a second surface allocation buffer and a second stream out buffer associated with the second video content in the memory, and to determine no change in the first video content at the second video composition operation, wherein the graphics processor is further to store the transparency data comprising the transparency indicator in the stream out buffer.

Further to the second embodiments, the graphics processor is further to generate second transparency data associated with a second surface of the second video content.

Further to the second embodiments, the first transparency data comprises indicators associated with at least one of blocks of the first surface or rows of blocks of the surface of the first video content.

Further to the second embodiments, the system further comprises a display device to present the composited video data.

Further to the second embodiments, the system further comprises an encoder to encode the composited video data and a transmitter to transmit the encoded composited video data to a remote display.

Further to the second embodiments, the first video content comprises a color space having an opacity channel and one or more first color channels and the second video content comprises a second color space having only one or more second color channels.

Further to the second embodiments, the graphics processor is further to generate, at the first composition operation, second transparency data associated with a surface of third video content, wherein the plurality of composition operations are to composite the first video content, the second video content, and the third video, and to copy, at the second video composition operation, a third region of the surface of the second video content based on a second transparency indicator of the transparency data and a transparency indicator of the second transparency data each associated with the third region of the surface of the second video content.

Further to the second embodiments, the system further comprises a central processor to determine, at a third video composition operation of the plurality of composition operations, a change in the first video content, wherein the graphics processor is further to generate, at the third composition operation, second transparency data associated with a second surface of the first video content.

Further to the second embodiments, the system further comprises a central processor to determine a bit mapping model associated with the first video content, wherein the bit mapping model provides a segmentation of the first surface into a plurality of regions comprising the region, and wherein the transparency data comprises an indicator associated with each of the plurality of regions.

Further to the second embodiments, the system further comprises a central processor to determine a bit mapping model associated with the first video content, wherein the bit mapping model provides a segmentation of the first surface into a plurality of regions comprising the region, wherein the transparency data comprises an indicator associated with each of the plurality of regions, and wherein the bit mapping model comprises a variable region size bit mapping model.

In one or more third embodiments, a system for compositing video content comprises means for generating, at a first composition operation of a plurality of composition operations to composite first video content and second video content, transparency data associated with a surface of the first video content, means for determining, at a second video composition operation of the plurality of composition operations, no change in the first video content, and means for copying, at the second video composition operation, a first region of a surface of the second video content based on a transparency indicator of the transparency data and means for blending, at the second video composition operation, a second region of the surface of the second video content with an associated region of the surface of the first video content based on a non-transparency indicator of the transparency data to generate composited video data.

Further to the third embodiments, the system further comprises means for generating an instruction call comprising an instruction to process only a portion of the surface of the second video content including the second region based on the transparency data.

Further to the third embodiments, the system further comprises means for allocating, in memory, a surface allocation buffer and a stream out buffer associated with the first video content and means for storing the transparency data comprising the transparency indicator in the stream out buffer.

Further to the third embodiments, the system further comprises means for generating second transparency data associated with a second surface of the second video content.

Further to the third embodiments, the first transparency data comprises indicators associated with at least one of blocks of the first surface or rows of blocks of the surface of the first video content.

Further to the third embodiments, the system further comprises means for presenting the composited video data.

Further to the third embodiments, the system further comprises means for encoding the composited video data and means for transmitting the encoded composited video data to a remote display.

Further to the third embodiments, the first video content comprises a color space having an opacity channel and one or more first color channels and the second video content comprises a second color space having only one or more second color channels.

Further to the third embodiments, the system further comprises means for generating, at the first composition operation, second transparency data associated with a surface of third video content, wherein the plurality of composition operations are to composite the first video content, the second video content, and the third video content, means for determining, at the second video composition operation of the plurality of composition operations, no change in the third video content, and means for copying, at the second video composition operation, a third region of the surface of the second video content based on a second transparency indicator of the transparency data and a transparency indicator of the second transparency data each associated with the third region of the surface of the second video content.

Further to the third embodiments, the system further comprises means for determining, at a third video composition operation of the plurality of composition operations, a change in the first video content and means for generating, at the third composition operation, second transparency data associated with a second surface of the first video content.

Further to the third embodiments, the system further comprises means for determining a bit mapping model associated with the first video content, wherein the bit mapping model provides a segmentation of the first surface into a plurality of regions comprising the region, and wherein the transparency data comprises an indicator associated with each of the plurality of regions.

Further to the third embodiments, the system further comprises means for determining a bit mapping model associated with the first video content, wherein the bit mapping model provides a segmentation of the first surface into a plurality of regions comprising the region, wherein the transparency data comprises an indicator associated with each of the plurality of regions, and wherein the bit mapping model comprises a variable region size bit mapping model.

In one or more fourth embodiments, at least one machine readable medium comprises a plurality of instructions that, in response to being executed on a computing device, cause the computing device to composite video content by generating, at a first composition operation of a plurality of composition operations to composite first video content and second video content, transparency data associated with a surface of the first video content, determining, at a second video composition operation of the plurality of composition operations, no change in the first video content, and copying, at the second video composition operation, a first region of a surface of the second video content based on a transparency indicator of the transparency data and blending, at the second video composition operation, a second region of the surface of the second video content with an associated region of the surface of the first video content based on a non-transparency indicator of the transparency data to generate composited video data.

Further to the fourth embodiments, the machine readable medium further comprises instructions that, in response to being executed on the computing device, cause the computing device to composite video content by generating an instruction call comprising an instruction to process only a portion of the surface of the second video content including the second region based on the transparency data.

Further to the fourth embodiments, the machine readable medium further comprises instructions that, in response to being executed on the computing device, cause the computing device to composite video content by generating second transparency data associated with a second surface of the second video content.

Further to the fourth embodiments, the machine readable medium further comprises instructions that, in response to being executed on the computing device, cause the computing device to composite video content by generating, at the first composition operation, second transparency data associated with a surface of third video content, wherein the plurality of composition operations are to composite the first video content, the second video content, and the third video content, determining, at the second video composition operation of the plurality of composition operations, no change in the third video content, and copying, at the second video composition operation, a third region of the surface of the second video content based on a second transparency indicator of the transparency data and a transparency indicator of the second transparency data each associated with the third region of the surface of the second video content.

Further to the fourth embodiments, the machine readable medium further comprises instructions that, in response to being executed on the computing device, cause the computing device to composite video content by determining, at a third video composition operation of the plurality of composition operations, a change in the first video content and generating, at the third composition operation, second transparency data associated with a second surface of the first video content.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for compositing video content comprising:
   generating, at a first composition operation of a plurality of composition operations to composite first video content and second video content, first transparency data associated with a surface of the first video content, wherein the first video content comprises an alpha channel;
   detecting, at a second video composition operation of the plurality of composition operations, no change in the first video content or a change in the first video content based on analysis of the alpha channel of the first video content; and
   in response to no change in the first video content being detected at the second video composition operation:
      accessing, at the second video composition operation, the first transparency data; copying, at the second video composition operation, a first region of a surface of the second video content based on a first transparency indicator of the first transparency data; and blending, at the second video composition operation, a second region of the surface of the second video content with an associated region of the surface of the first video content based on a first non-transparency indicator of the first transparency data to generate composited video data; or
   in response to the change in the first video content being detected at the second video composition operation:
      generating, at the second video composition operation, second transparency data associated with a second surface of the first video content, wherein the second surface corresponds to the change, wherein the second transparency data comprises a second transparency indicator and a second non-transparency indicator; copying, at the second video composition operation, a third region of the surface of the second video content based on the second transparency indicator; and blending, at the second video composition operation, a fourth region of the surface of the second video content with an associated region of the second surface of the first video content based on the second non-transparency indicator of the transparency data to generate the composited video data.

2. The method of claim 1, further comprising:
   generating an instruction call comprising an instruction to process only a portion of the surface of the second video content including the second region based on the transparency data.

3. The method of claim 1, further comprising:
   allocating, in memory, a surface allocation buffer and a stream out buffer associated with the first video content; and
   storing the transparency data comprising the transparency indicator in the stream out buffer.

4. The method of claim 1, further comprising:
   generating third transparency data associated with a third surface of the second video content.

5. The method of claim 1, wherein the first transparency data comprises indicators associated with at least one of blocks of the first surface or rows of blocks of the surface of the first video content.

6. The method of claim 1, further comprising:
   presenting the composited video data via a display.

7. The method of claim 1, further comprising:
   encoding the composited video data; and
   transmitting the encoded composited video data to a remote display.

8. The method of claim 1, wherein the first video content comprises a color space having an opacity channel and one or more first color channels and the second video content comprises a second color space having only one or more second color channels.

9. The method of claim 1, further comprising:
   generating, at the first composition operation, third transparency data associated with a surface of third video content, wherein the plurality of composition operations are to composite the first video content, the second video content, and the third video content;
   determining, at the second video composition operation of the plurality of composition operations, no change in the third video content; and
   copying, at the second video composition operation, a fifth region of the surface of the second video content based on a third transparency indicator of the first transparency data and a fourth transparency indicator of the third transparency data each associated with the fifth region of the surface of the second video content.

10. The method of claim 1, further comprising:
determining, at a third video composition operation of the plurality of composition operations, a second change in the first video content; and
generating, at the third composition operation, third transparency data associated with a third surface of the first video content.

11. The method of claim 1, further comprising:
determining a bit mapping model associated with the first video content, wherein the bit mapping model provides a segmentation of the first surface into a plurality of regions comprising the region, and wherein the transparency data comprises an indicator associated with each of the plurality of regions.

12. The method of claim 11, wherein the bit mapping model comprises a variable region size bit mapping model.

13. A system for compositing video content comprising:
a memory comprising a surface allocation buffer and a stream out buffer associated with first video content; and
a graphics processor coupled to the memory, the graphics processor to:
generate, at a first composition operation of a plurality of composition operations to composite the first video content and second video content, first transparency data associated with a surface of the first video content, wherein the first video content comprises an alpha channel;
detect, at a second video composition operation of the plurality of composition operations, no change in the first video content or a change in the first video content based on analysis of the alpha channel of the first video content; and
in response to no change in the first video content being detected at the second video composition operation:
access, at the second video composition operation, the first transparency data; copy, at the second video composition operation, a first region of a surface of the second video content based on a first transparency indicator of the first transparency data; and to blend, at the second video composition operation, a second region of the surface of the second video content with an associated region of the surface of the first video content based on a first non-transparency indicator of the first transparency data to generate composited video data; or
in response to the change in the first video content being detected at the second video composition operation:
generate, at the second video composition operation, second transparency data associated with a second surface of the first video content, wherein the second surface corresponds to the change, wherein the second transparency data comprises a second transparency indicator and a second non-transparency indicator; copy, at the second video composition operation, a third region of the surface of the second video content based on the second transparency indicator; and blend, at the second video composition operation, a fourth region of the surface of the second video content with an associated region of the second surface of the first video content based on the second non-transparency indicator of the transparency data to generate the composited video data.

14. The system of claim 13, further comprising:
a central processor to generate an instruction call comprising an instruction to process only a portion of the surface of the second video content including the second region based on the transparency data and to transmit the instruction call to the graphics processor.

15. The system of claim 13, further comprising:
a central processor to allocate the surface allocation buffer and the stream out buffer associated with the first video content, to allocate a second surface allocation buffer and a second stream out buffer associated with the second video content in the memory, and to determine no change in the first video content at the second video composition operation, wherein the graphics processor is further to store the transparency data comprising the transparency indicator in the stream out buffer.

16. The system of claim 13, wherein the graphics processor is further to generate third transparency data associated with a third surface of the second video content.

17. The system of claim 13, wherein the first transparency data comprises indicators associated with at least one of blocks of the first surface or rows of blocks of the surface of the first video content.

18. The system of claim 13, wherein the graphics processor is further to:
generate, at the first composition operation, third transparency data associated with a surface of third video content, wherein the plurality of composition operations are to composite the first video content, the second video content, and the third video;
determine, at the second video composition operation of the plurality of composition operations, no change in the third video content; and
copy, at the second video composition operation, a fifth region of the surface of the second video content based on a third transparency indicator of the first transparency data and a fourth transparency indicator of the third transparency data each associated with the fifth region of the surface of the second video content.

19. The system of claim 13, further comprising:
a central processor to determine, at a third video composition operation of the plurality of composition operations, a second change in the first video content, wherein the graphics processor is further to generate, at the third composition operation, third transparency data associated with a third surface of the first video content.

20. The system of claim 13, further comprising:
a central processor to determine a bit mapping model associated with the first video content, wherein the bit mapping model provides a segmentation of the first surface into a plurality of regions comprising the region, and wherein the transparency data comprises an indicator associated with each of the plurality of regions.

21. At least one non-transitory machine readable medium comprising a plurality of instructions that, in response to being executed on a computing device, cause the computing device to composite video content by:
generating, at a first composition operation of a plurality of composition operations to composite first video content and second video content, first transparency data associated with a surface of the first video content, wherein the first video content comprises an alpha channel;
detecting, at a second video composition operation of the plurality of composition operations, no change in the first video content or a change in the first video content based on analysis of the alpha channel of the first video content; and in response to no change in the first video content being detected at the second video composition operation:
accessing, at the second video composition operation, the first transparency data; copying, at the second video composition operation, a first region of a surface of the second video content based on a first transparency indicator of the first transparency data; and blending, at the second video composition operation, a second region of the surface of the second video content with an associated region of the surface of the first video content based on a first non-transparency indicator of the first transparency data to generate composited video data; or in response to the change in the first video content being detected at the second video composition operation:
generating, at the second video composition operation, second transparency data associated with a second surface of the first video content, wherein the second surface corresponds to the change, wherein the second transparency data comprises a second transparency indicator and a second non-transparency indicator, copying, at the second video composition operation, a third region of the surface of the second video content based on the second transparency indicator, and blending, at the second video composition operation, a fourth region of the surface of the second video content with an associated region of the second surface of the first video content based on the second non-transparency indicator of the transparency data to generate the composited video data.

22. The non-transitory machine readable medium of claim 21, further comprising instructions that, in response to being executed on the computing device, cause the computing device to composite video content by:
generating an instruction call comprising an instruction to process only a portion of the surface of the second video content including the second region based on the transparency data.

23. The non-transitory machine readable medium of claim 21, further comprising instructions that, in response to being executed on the computing device, cause the computing device to composite video content by:
generating third transparency data associated with a third surface of the second video content.

24. The non-transitory machine readable medium of claim 21, further comprising instructions that, in response to being executed on the computing device, cause the computing device to composite video content by:
generating, at the first composition operation, third transparency data associated with a surface of third video content, wherein the plurality of composition operations are to composite the first video content, the second video content, and the third video content;
determining, at the second video composition operation of the plurality of composition operations, no change in the third video content; and
copying, at the second video composition operation, a fifth region of the surface of the second video content based on a third transparency indicator of the first transparency data and a fourth transparency indicator of the third transparency data each associated with the fifth region of the surface of the second video content.

25. The non-transitory machine readable medium of claim 21, further comprising instructions that, in response to being executed on the computing device, cause the computing device to composite video content by:
determining, at a third video composition operation of the plurality of composition operations, a second change in the first video content; and
generating, at the third composition operation, third transparency data associated with a third surface of the first video content.

\* \* \* \* \*